US008055789B2

(12) United States Patent
Richardson et al.

(10) Patent No.: US 8,055,789 B2
(45) Date of Patent: Nov. 8, 2011

(54) CONFIGURING INTERCOMMUNICATIONS BETWEEN COMPUTING NODES

(75) Inventors: David R. Richardson, Seattle, WA (US); Daniel T. Cohn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 969 days.

(21) Appl. No.: 11/692,038

(22) Filed: Mar. 27, 2007

(65) Prior Publication Data

US 2008/0240122 A1    Oct. 2, 2008

(51) Int. Cl.
*H04L 12/56* (2006.01)
(52) U.S. Cl. .......................... 709/238; 370/401
(58) Field of Classification Search .................. 709/238; 370/401
See application file for complete search history.

(56) References Cited

U.S. PATENT DOCUMENTS

| | | | | |
|---|---|---|---|---|
| 6,411,967 | B1 | 6/2002 | Van Renesse | 707/201 |
| 6,529,953 | B1 | 3/2003 | Van Renesse | 709/223 |
| 6,724,770 | B1 | 4/2004 | Van Renesse | 370/432 |
| 7,068,666 | B2 | 6/2006 | Foster et al. | 370/397 |
| 7,068,667 | B2 | 6/2006 | Foster et al. | 370/398 |
| 7,124,289 | B1 | 10/2006 | Suorsa | 713/1 |
| 7,131,123 | B2 | 10/2006 | Suorsa et al. | 717/177 |
| 7,152,109 | B2 | 12/2006 | Suorsa et al. | 709/226 |
| 7,908,395 | B1* | 3/2011 | Salkewicz | 709/238 |
| 2002/0138628 | A1* | 9/2002 | Tingley et al. | 709/227 |
| 2005/0114507 | A1* | 5/2005 | Tarui et al. | 709/224 |
| 2005/0120160 | A1* | 6/2005 | Plouffe et al. | 711/1 |
| 2006/0184936 | A1 | 8/2006 | Abels et al. | |
| 2007/0237161 | A1* | 10/2007 | Akisada | 370/400 |

OTHER PUBLICATIONS

"Chapter: Configuring Layer 2 Services Over MPLS," JUNOSe Internet Software for E-series Routing Platforms: Routing Protocols Configuration Guide, vol. 2, Mar. 2004, retrieved Jan. 26, 2007, from http://www.juniper.net/techpubs/software/erx/junose52/swconfig-routing-vol2/html/title-swconfig..., pp. 357-382, 31 pages.
"Cisco IP Solution Center MPLS VPN Management 4.2, " Cisco Systems, Inc., retrieved Jan. 24, 2007, from http://www.cisco.com/en/US/products/sw/netmgtsw/ps5332/products_data_sheet09186a008017d7..., 5 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"MPLS-enabled VPN Services," Data Connection, retrieved Jan. 26, 2007, from http://www.dataconnection.com/solutions/vpn_vlan.htm, 1 page.

(Continued)

*Primary Examiner* — Wing Chan
*Assistant Examiner* — Kostas Katsikis
(74) *Attorney, Agent, or Firm* — Seed IP Law Group PLLC

(57) ABSTRACT

Techniques are described for configuring intercommunications between multiple computing nodes, such as multiple virtual machine nodes hosted on one or more physical computing machines or systems. In some situations, virtual networks may be established and maintained for groups of computing nodes, such as those operated by or on behalf of various users. Such virtual networks may be established in some situations by automatically configuring various communication manager modules to associate communications from a computing node belonging to a virtual network with one or more networking identifiers associated with the virtual network, such that other communication manager modules may appropriately forward or otherwise process such communications.

32 Claims, 10 Drawing Sheets

OTHER PUBLICATIONS

"Recent Advances Boost System Virtualization," eWeek.com, retrieved May 3, 2006, from http://www.eweek.com/article2/0,1895,1772626,00.asp, 5 pages.

"Scalable Trust of Next Generation Management (STRONGMAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Reverse Firewall™: Defeating DDoS Attacks Emerging from Local Area Networks," Cs3, Inc., retrieved Nov. 11, 2005, from http://www.cs3-inc.com/rfw.html, 4 pages.

"The Softricity Desktop," Softricity, retrieved May 3, 2006, from http://www.softricity.com/products/, 3 pages.

Bellovin, S., "Distributed Firewalls," Nov. 1999, issue of ;login:, pp. 37-39, retrieved Nov. 11, 2005, from http://www.cs.columbia.edu/~smb/papers/distfw.html, 10 pages.

Blaze, M., "Using the KeyNote Trust Management System," Mar. 1, 2001, retrieved May 17, 2006, from http://www.crypto.com/trustmgt/kn.html, 4 pages.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Chown, T., "Use of VLANs for IPv4-IPv6 Coexistence in Enterprise Networks: draft-ietf-v6ops-vlan-usage-01," IPv6 Operations, University of Southampton, Mar. 6, 2006, retrieved Jun. 15, 2007, from http://tools.ietf.org/html/draft-ietf-v6ops-vlan-usage-01, 13 pages.

Coulson, D., "Network Security Iptables," Apr. 2003, Linuxpro, Part 2, retrieved from http://davidcoulson.net/writing/lxf/39/ipstables.pdf, 4 pages.

Coulson, D., "Network Security Iptables," Mar. 2003, Linuxpro, Part 1, retrieved from http://davidcoulson.net/writing/lxf/38/iptables.pdf, 4 pages.

Demers, A., "Epidemic Algorithms for Replicated Database Maintenance," 1987, Proceedings of the sixth annual ACM Symposium on Principles of distributed computing, Vancouver, British Columbia, Canada, Aug. 10-12, 1987, 12 pages.

Gruener, J., "A vision of togetherness," May 24, 2004, NetworkWorld, retrieved May 3, 2006, from, http://www.networkworld.com/supp/2004/ndc3/0524virt.html, 9 pages.

Ioannidis, S., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dsl/STRONGMAN/Papers/df.pdf, 10 pages.

Kenshi, P., "Help File Library: Iptables Basics," Justlinux, retrieved Dec. 1, 2005, from http://www.justlinux.com/nhf/Security/Iptables_Basics.html, 4 pages.

Shankland, S., "Sun to buy start-up to bolster N1," Jul. 30, 2003, CNet News.com, retrieved May 3, 2006, http://news.zdnet.com/2100-35213_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.dpf, 158 pages.

Townsley, M., et al., "Encapsulation of MPLS over Layer 2 Tunneling Protocol Version 3: draft-ietf-mpls-over-12tpv3-03.txt," Network Working Group, Nov. 2006, retrieved Jun. 15, 2007, from http://tools.ietf.org/html/draft-ietf-mpls-over-12tpv3-03, 12 pages.

Van Renesse, R., "Astrolabe: a Robust and Scalable Technology for Distributed System Monitoring, Management, and Data Mining," May 2003, ACM Transactions on Computer Systems (TOCS), 21(2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtualiron®, retrieved May 3, 2006, from http://www.virtualiron.com/, 1 page.

Waldspurger, C.A., "Spawn: A Distributed Computational Economy," Feb. 1992, IEEE Transactions on Software Engineering, 18(2):103-117, 15 pages.

* cited by examiner

CONFIGURING INTERCOMMUNICATIONS BETWEEN COMPUTING NODES

TECHNICAL FIELD

The following disclosure relates generally to configuring intercommunications between computing nodes, such as by establishing virtual networks that include virtual machines executing on physical computing systems.

BACKGROUND

Data centers housing significant numbers of interconnected computing systems have become commonplace, such as private data centers that are operated by and on behalf of a single organization, as well as public data centers that are operated by entities as businesses. For example, some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided a partial solution to the problem of managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

While the availability of data centers and virtualization technologies has provided various benefits, various problems still exist. For example, one problem that arises in the context of data centers that virtually or physically host large numbers of applications for a set of diverse customers involves providing network isolation for the applications hosted for each customer, such as to allow communications between the computing systems executing a customer's applications while restricting undesired communications between those computing systems and other computing systems (e.g., computing systems hosted for other customers, computing systems external to the data center, etc.). One traditional approach to providing network isolation in such situations has focused on providing dedicated physical networks to each customer, such as a physical network that includes multiple computing systems interconnected via one or more networking switch, hub and/or bridge devices. Such dedicated networks may provide the desired network isolation for the computing systems of each customer, but come at considerable cost in terms of network design, implementation, and provisioning. In particular, changes to the number and/or type of computing systems deployed by each customer may entail significant changes to the physical networking infrastructure used to connect those systems. Such problems may be exacerbated in the context of virtual hosting environments, where hardware virtualization allows for highly dynamic, flexible reconfiguration of computing environments. Providing dedicated physical networks to each customer in a virtual hosting environment may accordingly eliminate many of the benefits of virtual hosting, such as the ability to dynamically reconfigure the computing environment to meet customer demand, data center administrative needs, etc.

Thus, it would be beneficial to provide techniques that allow intercommunications between computing systems to be dynamically configured, as well as to provide other benefits.

DETAILED DESCRIPTION

Figure 1:
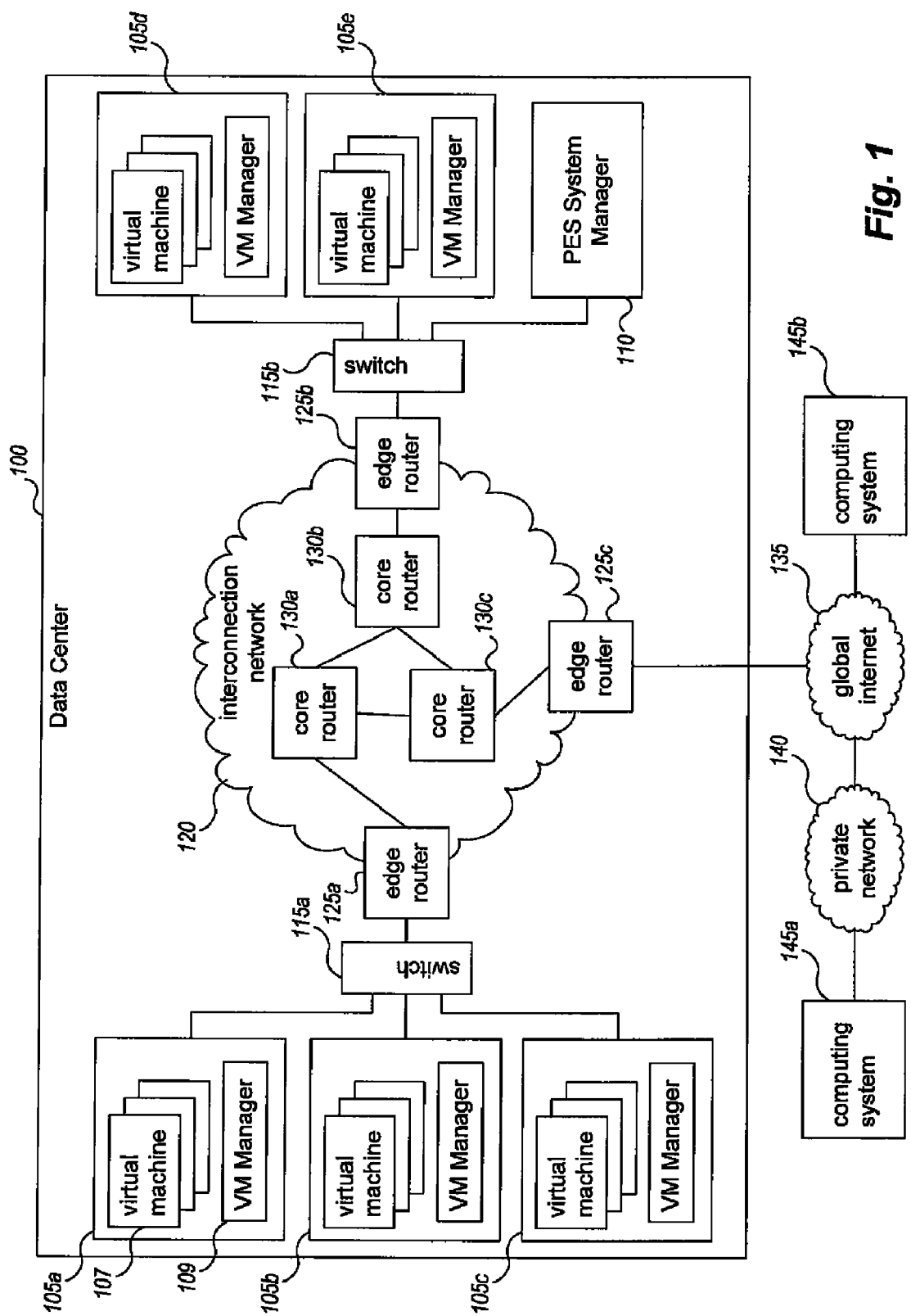
FIG. 1 is a network diagram illustrating an example embodiment in which a program execution service configures intercommunications between computing nodes.

Techniques are described for configuring intercommunications between multiple computing nodes, such as to provide network isolation for communications between selected nodes in a configurable manner. In at least some embodiments, the computing nodes may be physical computing systems and/or virtual machines that are each hosted on one or more physical computing systems, and the intercommunications may include transmissions of data (e.g., messages, packets, frames, streams, etc.) between computing nodes over one or more networks. In addition, in some embodiments, at least some of the computing nodes are part of a program execution service for executing multiple programs on behalf of multiple users of the service, such as a program execution service that uses multiple computing systems on multiple physical networks (e.g., multiple physical computing systems and networks within a data center). In at least some embodiments, the described techniques are automatically performed by an embodiment of a System Manager module, as described in greater detail below.

In some embodiments, intercommunications between computing nodes are configured by establishing virtual networks between selected computing nodes, such that access to at least some communications from and/or to the nodes of a particular virtual network are limited to other computing nodes that belong to the virtual network. In this manner, network isolation may be achieved for computing nodes that belong to a virtual network even if those computing nodes are part of physical networks with other computing systems that are not part of the virtual network. In some cases, such virtual networks may be established via the operation of one or more communication manager modules executing on host physical computing systems and/or on networking devices. In particular, in some embodiments, configuring intercommunications between multiple computing nodes includes configuring one or more communication manager modules so that a selected computing node becomes associated with a particular virtual network, such as when that selected computing node begins to execute one or more software programs that will exchange communications associated with that virtual network. For example, when a particular computing node begins to execute one or more software programs on behalf of a user who is a customer of the program execution service, and that customer user also has other software programs executing on other computing nodes, the new computing node executing the customer's program(s) may be selected to be associated with a virtual network for the customer. The configured communication manager modules will manipulate communications from a selected computing node so as to reflect its associated virtual network, such that computing nodes on other virtual networks do not gain access to those communications. In addition, the configured communication manager modules may also forward communications from other computing nodes on that virtual network to the selected computing node as appropriate.

Furthermore, in at least some embodiments, at least some virtual networks may each use two or more distinct networking protocols for communications on the virtual network. For example, for a computing node selected to be part of a virtual network, a first networking protocol may be utilized to associate communications from the selected computing node with the virtual network for purposes of transport over a local physical network (e.g., a local Ethernet-based network possibly managed by a switch or other networking device) to which the selected computing node belongs, such as by using a first networking identifier based on the first networking protocol that is associated with the virtual network. A networking protocol that operates at layer two (the Data Link layer) of the seven-layer Open Systems Interconnection ("OSI") Basic Reference Model may be used for the physical network, such as, for example, a networking protocol that uses tags based on the Virtual Local Area Network ("VLAN") protocol. Additional details related to the VLAN protocol are discussed as part of the IEEE ("Institute of Electrical and Electronics Engineers") 802.1Q standard. A second networking protocol may then be used to associate communications with the virtual network for purposes of transport over one or more interconnection networks that connect the first physical network with other physical networks that have one or more computing nodes that are part of the virtual network, such as a networking protocol that operates at layer three (the Network layer) of the seven-layer OSI Basic Reference Model, or by using a mix of layer 2 and layer 3 functionality (sometimes referred to as layer 2.5). For example, a distinct second networking identifier based on the second networking protocol that is also associated with the virtual network may be used for forwarding communications over the interconnection network(s). One example of a networking protocol that may be used over one or more interconnection networks is by use of Label Switch Path ("LSP") labels based on the Multi-Protocol Label Switching ("MPLS") protocol. In addition, each of the other physical networks may similarly use a layer 2 and/or layer 3 networking protocol for communications associated with the virtual network, whether the same as the first networking protocol or a distinct third (or more) networking protocol. By using various networking protocols that are appropriate for transport of communications over various kinds of networks, a virtual network may be established that efficiently and logically spans multiple and different kinds of networks.

As noted above, one or more communication manager modules may be configured so that a selected computing node becomes associated with a particular virtual network. Furthermore, in at least some embodiments, multiple communication manager modules may operate in a coordinated manner to establish multiple virtual networks that each includes a number of intercommunicating participant computing nodes. Such communication manager modules may include virtual machine communication manager modules (also referred to as "virtual machine manager modules") that each execute on a host physical computing system to manage the communications by the physical computing system, such as communications by multiple virtual machines executing on the physical computing system. Communication manager modules may further operate as part of networking devices (such as routers, bridges, and/or switches), such as to identify, control, and manipulate intercommunications between computing nodes associated with various physical and/or virtual networks. In particular, as part of provisioning a virtual machine on a first host physical computing system to execute one or more software programs, the virtual machine communication manager module for the first host computing system may be configured to associate that virtual machine and its communications with the particular virtual network. For example, if the virtual machine is associated with a first virtual network that uses a first networking protocol for the local physical network (e.g., a first VLAN tag specific to the first virtual network), the virtual machine communication manager module may associate that first VLAN tag with communications sent by that virtual machine, and may similarly forward received communications having that first VLAN tag to that virtual machine. At the same time, that virtual machine communication manager module may similarly support one or more other virtual machines on the first host physical computing system that are associated with a distinct second virtual network that uses a distinct second VLAN tag. In addition, a networking device on the same physical network with the first host physical computing system may be configured to associate communications with the first VLAN tag with a second networking protocol for the first virtual network, and may be configured to associate communications with the second VLAN tag with another networking protocol for the second virtual network. The configuration and operation of such communication manager modules is discussed in greater detail below.

As previously noted, in some embodiments, a program execution service executes third-party customers' programs using multiple physical computing systems (e.g., in one or more data centers) that each host multiple virtual machines, with each virtual machine being able to execute one or more programs for a customer. In such situations, the described techniques may be used by one or more communication manager modules executing as part of the program execution service to control communications to and from the programs of each customer. In some embodiments, customers may provide programs to be executed to the execution service, as discussed in greater detail below, and may reserve execution time and other resources on physical or virtual hardware facilities provided by the execution service. In addition, customers may define virtual networks that will be used by the program execution service, so as to transparently provide computing nodes of the virtual network with the appearance of operating on a dedicated physical network.

In some embodiments, at least some of the described techniques are performed by a System Manager module for an embodiment of a program execution service ("PES"), such as by coordinating the configuration of communication manager modules to support virtual networks for virtual machines hosted by the PES. For example, the System Manager module may receive an indication of a virtual machine on a target physical computing system that is part of one of multiple physical networks of the PES. The System Manager module may then determine a virtual network with which the virtual machine is to be associated. After determining the virtual network associated with the virtual machine, the System Manager module then initiates configuration of a virtual machine communication manager module for the target physical computing system to associate the virtual machine with the virtual network. Furthermore, the System Manger module may further configure one or more other networking devices to support the virtual network, such as on the physical network of the target physical computing system and/or as part of an interconnection network that connects multiple physical networks.

For illustrative purposes, some embodiments are described below in which specific types of computing nodes, networks, intercommunications, and configuration operations are performed. These examples are provided for illustrative purposes and are simplified for the sake of brevity, and the inventive techniques can be used in a wide variety of other situations, some of which are discussed below.

FIG. 1 is a network diagram illustrating an example embodiment in which intercommunications between computing nodes of a program execution service are configured by a system manager module and multiple communication manager modules of the program execution service. The illustrated example includes a data center 100 operated by the program execution service that is connected to a global internet 135 external to the data center 100. The global internet 135 may be a publicly accessible network of networks, possibly operated by various distinct parties, such as the Internet. In this example, the global internet 135 provides access to computing system 145a via private network 140 and provides access to computing system 145b. The private network 140 may be, for example, a corporate network that is wholly or partially inaccessible from computing systems external to the private network 140. Computing system 145b may be, for example, a home computing system that connects directly to the Internet (e.g., via a telephone or cable modem, a Digital Subscriber Line ("DSL"), etc.)

The data center 100 includes a number of physical computing systems 105a-105e and a System Manager module 110 of the program execution service. In this example, each physical computing system 105a-105e includes a virtual machine ("VM") Manager module and one or more virtual machines, such as VM Manager module 109 and virtual machines 107 executing on computing system 105a. In other embodiments, at least some physical computing systems at the data center may not host any virtual machines, and instead may directly execute one or more software programs on behalf of a customer of the program execution service. The data center further includes multiple networking devices, such as switches 115a-115b, edge routers 125a-125c, and core routers 130a-130c. Switch 115a is part of a physical network that includes physical computing systems 105a-105c, and is connected to edge router 125a. Switch 115b is part of a distinct physical network that includes physical computing systems 105d-105e and a computing system providing the PES System Manager 110, and is connected to edge router 125b. The physical networks established by switches 115a-115b, in turn, are connected to each other and other networks (e.g., the global internet 135) via an interconnection network 120, which includes the edge routers 125a-125c and the core routers 130a-130c. The edge routers 125a-125c provide gateways between two or more networks. For example, edge router 125a provides a gateway between the physical network established by switch 115a and the interconnection network 120. Edge router 125c provides a gateway between the interconnection network 120 and global internet 135. The core routers 130a-130c manage communications within the interconnection network 120, such as by forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on network topology, etc.).

The illustrated PES System Manager module 110 performs at least some of the described techniques in order to configure intercommunications between the virtual machines hosted by the physical computing systems 105a-105e. As described in more detail elsewhere, intercommunications may be configured so as to be associated with virtual networks. The associating of virtual machines with virtual networks and the establishing of those virtual networks may include configuring of virtual machine manager modules (e.g., VM manager 109) and/or networking devices (e.g., edge router 125a). In some cases, at least some of the networking devices may also or instead automatically learn and/or self-configure, such that only some communication manager modules (e.g., VM managers and/or routers) need be configured by the PES System Manager 110 in order to cause network configuration information for a particular virtual network to automatically propagate over the various networks to the appropriate communication manager modules.

Figure 2A:
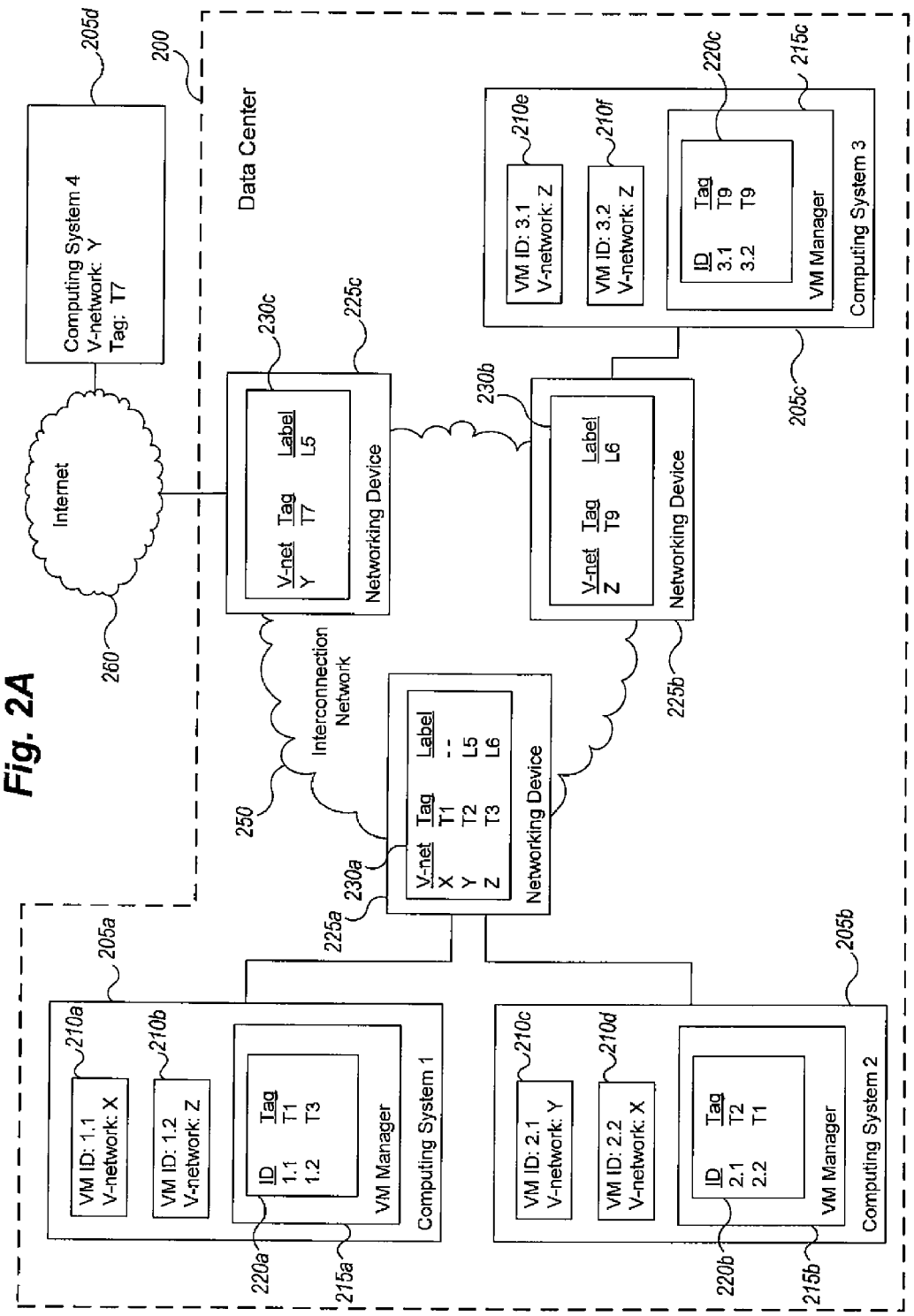
FIGS. 2A-E illustrate examples of establishing virtual networks among multiple physical networks.
Figure 2B:
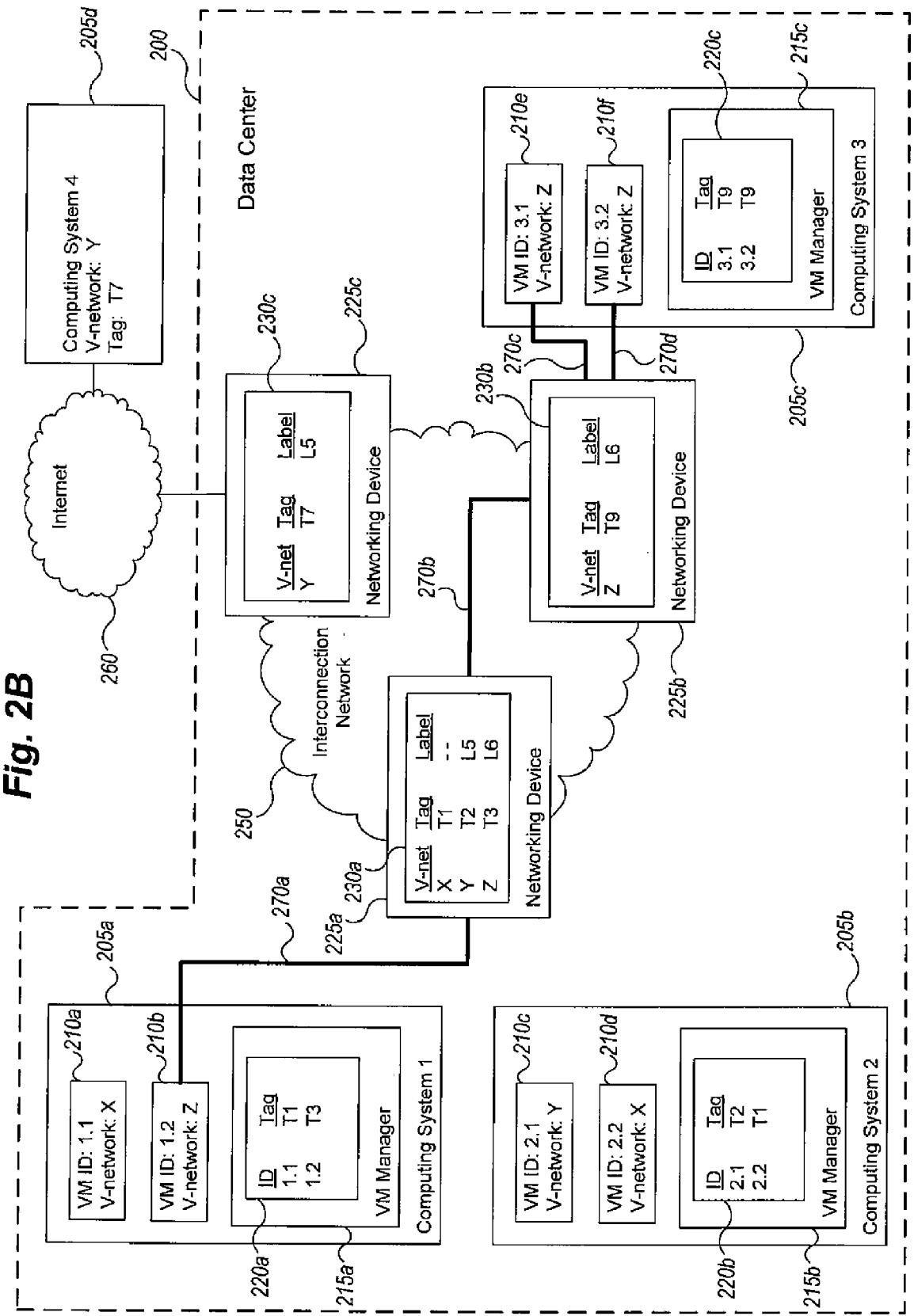
Figure 2C:
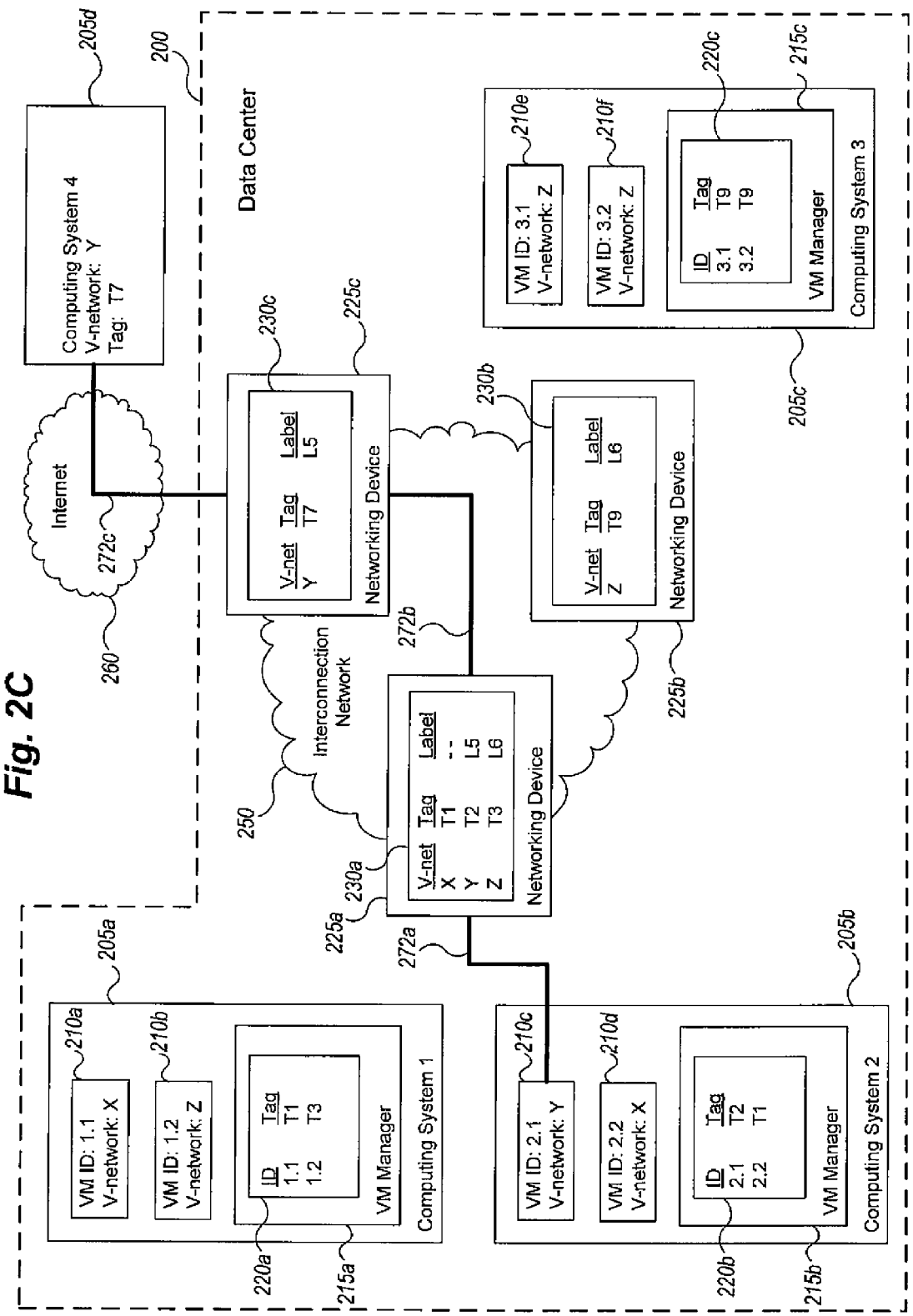
Figure 2D:
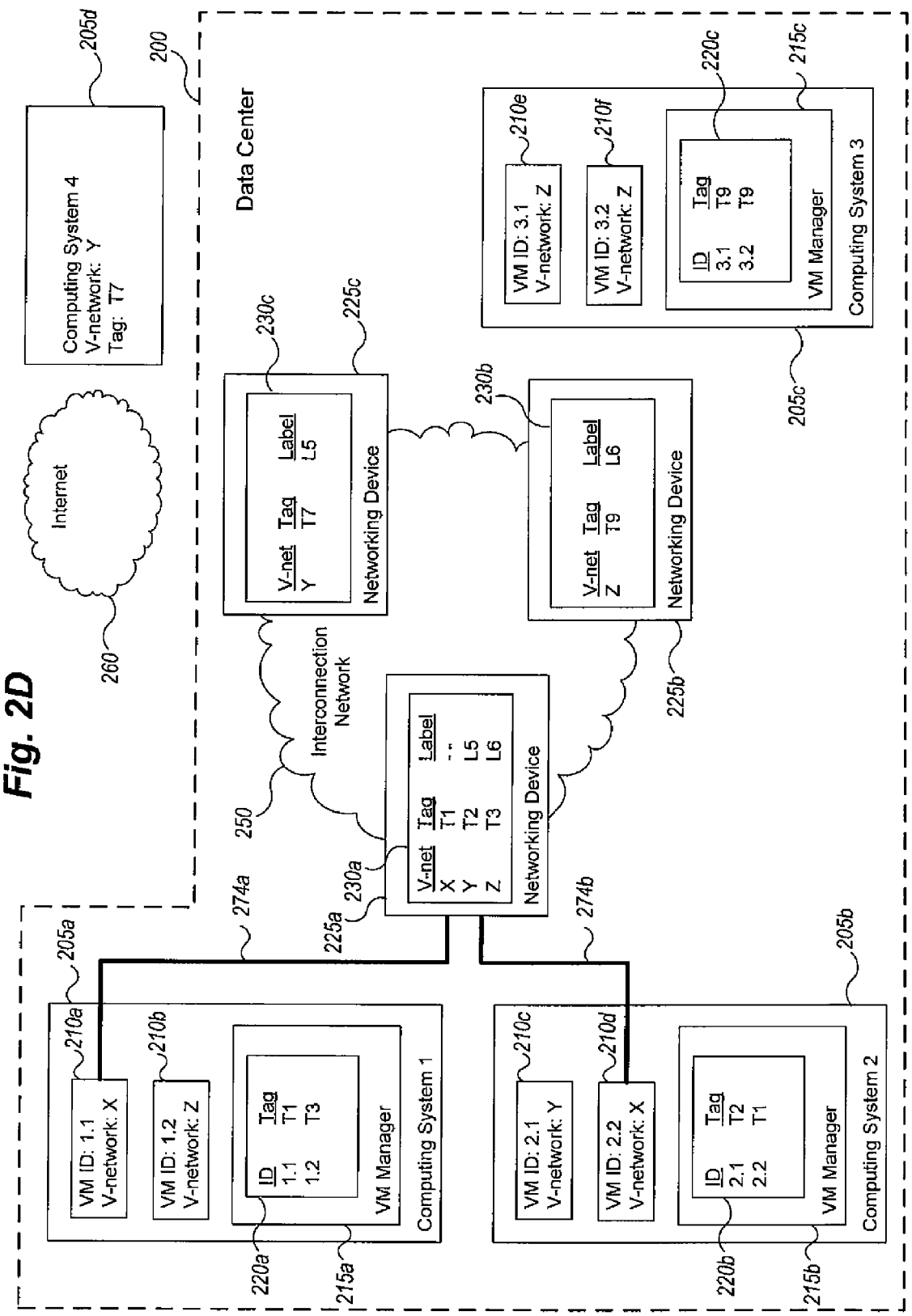
Figure 2E:
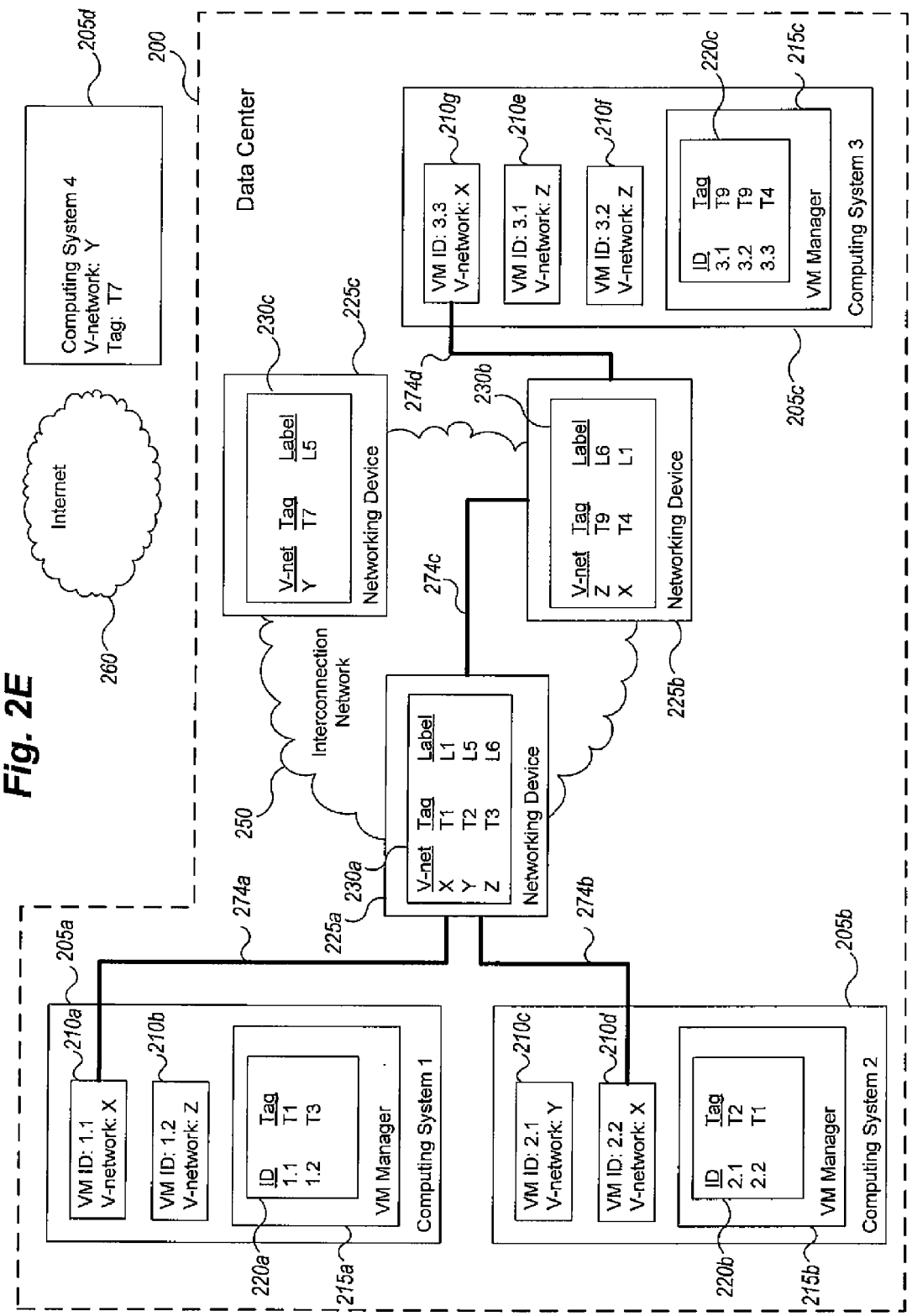

FIGS. 2A-E illustrate examples of various virtual networks established over multiple physical networks connecting multiple computing nodes. In particular, FIG. 2A illustrates an example arrangement of physical networks connecting multiple computing nodes, along with configuration information used to establish and maintain three virtual networks. FIGS. 2B-2D each illustrates one of the three virtual networks, superimposed upon the network diagram of FIG. 2A. FIG. 2E illustrates a modification to one of the three virtual networks, made in response to the initialization of a new virtual machine.

FIG. 2A illustrates a data center 200 that is connected to an external computing system 205d via external Internet 260. The data center 200 includes an interconnection network 250 that includes networking devices 225a-225c. Networking device 225a provides a gateway between computing systems 205a-205b and the interconnection network 250. Networking device 225b provides a gateway between computing system 205c and the interconnection network 250. Networking device 225c provides a gateway between the interconnection network 250 and the external internet 260. It will be appreciated that the example data center of FIG. 2A is simplified for the purposes of illustration, and that much larger numbers of computing systems and networking devices may be present in other embodiments.

In the illustrated example, computing systems 205a-205c are each hosting two executing virtual machines and a virtual machine manager module. In particular, computing system 205a hosts Virtual Machine Manager module ("VM Manager") 215a and virtual machines 210a-210b, having virtual machine identifiers ("VM IDs") 1.1 and 1.2, respectively. Computing system 205b hosts VM Manager 215b and virtual machines 210c-210d, having VM IDs 2.1 and 2.2, respectively. Computing system 205c hosts VM Manager 215c and virtual machines 210e-210f, having VM IDs 3.1 and 3.2, respectively. In addition, each virtual machine is illustrated as belonging to a virtual network. In particular, virtual machines 210a-210f belong to virtual networks X, Z, Y, X, Z, and Z, respectively. In other embodiments, some virtual machines may belong to zero or multiple virtual networks.

In this example, each VM Manager 215a-215c includes groups of network configuration information 220a-220c, respectively. Each network configuration information group 220a-220c includes a mapping between virtual machine identifier ("ID") and a networking identifier ("Tag"). In the illustrated embodiment, the virtual machine manager module on a particular host associates communications originating from each virtual machine on that host with the appropriate networking identifier, so that the communications may be accordingly identified and processed by networking devices and/or other virtual machine manager modules. Associating a communication with a network identifier may be performed in various ways, such as by marking, labeling, tagging, encapsulating, or otherwise modifying the communication, such that the communication includes an indication of the networking identifier. In some embodiments, this may include modifying or supplementing header information utilized to direct the communication over the network (e.g., an Ethernet header, IP header, TCP header, etc.). In the illustrated embodiment, the virtual machine manager module on each host computing system tags communications originating from each virtual machine on that host with the networking identifier associated with that virtual machine. The tagged communications are then forwarded over the physical network, and processed by downstream networking devices and/or other virtual machine manager modules, as will be explained in more detail below.

Each networking device 225a-225c includes network configuration information 230a-230c, respectively. The network configuration information maintained by networking devices serves a purpose similar to that of the network configuration information maintained by the virtual machine manager modules. In the illustrated example, the network configuration information maintained by networking devices provides a mapping between virtual network indicators ("V-net"), networking identifiers associated with communications for purposes of transport over physical networks ("Tag") and networking identifiers associated with communications for purposes of transport over the interconnection network ("Label"). Networking devices may associate networking identifiers with communications as those communications are transported over the interconnection network, so that they may be efficiently routed by any core routers (not shown) of the interconnection network and/or forwarded only to routers that provide gateways to networks having nodes that also belong to the virtual networks associated with those networking identifiers.

Utilizing two types of networking identifiers, such as tags and labels in the illustrated embodiment, may provide various advantages. For example, such an approach may decouple the implementation of virtual networking on the various physical networks. For example, communication manager modules on separate physical networks may make independent decisions as to tag selection, thereby simplifying virtual network management and implementation. In essence, a separate tag "namespace" is created for each physical network, such that nodes on the same virtual network but on different physical networks may be associated with the same, or different, tags without compromising performance or risk of tag collision or mismatch. For example, in the illustrated example, virtual machines 210b (VM ID 1.2) and 210e (VM ID 3.1) are both members of virtual network Z, but respectively use physical network tags T3 and T9, as shown in network configuration information 220a and 220c. In this example, for the sake of simplicity, each virtual network is shown as using a single label through the interconnection network (e.g., virtual network Z is shown using label L6), but in other embodiments multiple distinct labels or other networking identifiers may be used for a single virtual network in different portions of the interconnection network.

The types of networking identifiers used, and techniques for associating and disassociating such networking identifiers with machine communications are described in more detail by various networking standards. The illustrated embodiment, for example, uses Virtual Local Area Network ("VLAN") tags at Layer 2 (i.e., the Data Link layer) of the Open Systems Interconnection ("OSI") protocol stack as networking identifiers for purpose of establishing virtual networks over physical networks. In addition, the illustrated embodiment uses Multi-Protocol Label Switching ("MPLS") labels at OSI Layer 3 (i.e., the Network layer) together with Border Gateway Protocol ("BGP") as a routing protocol for purposes of establishing virtual networks over interconnection networks. Other approaches are contemplated, based on various other network virtualization standards and techniques such as IPSEC ("IP Security"), L2TP ("Layer 2 Tunneling Protocol"), PPTP ("Point-to-Point Tunneling Protocol"), IP in IP Encapsulation, GRE ("Generic Routing Encapsulation"), IPv6 ("Internet Protocol version 6"), VPLS ("Virtual Private LAN Services"), Generic Routing Encapsulation (GRE), etc.

FIG. 2B illustrates virtual network Z, superimposed on the network diagram of FIG. 2A using darker lines. In the illustrated example, virtual machines 210b (VM ID 1.2), 210e (VM ID 3.1), and 210f (VM ID 3.2) are each members of virtual network Z. Virtual network Z is illustrated logically as links 270a-270d that connect virtual machines 210b, 210e, and 210f to one another. For clarity, physical network segments as illustrated in FIG. 2A are not shown.

In the illustrated embodiment, virtual network Z is established and maintained by configuring virtual machine manager modules and/or networking devices to associate networking identifiers with communications originating from members of the virtual network, such that those communications can be appropriately forwarded by various networking devices and/or virtual machine manager modules. For example, a communication originating with virtual machine 210b and destined for virtual machine 210e and/or 210f will be associated with tag T3, as specified by network configuration information 220a, by VM Manager 215a prior to being forwarded over the physical network connecting computing system 205a and networking device 225a. After networking device 225a receives the communication, it will disassociate the communication from tag T3 and associate the communication with label L6, as specified by network configuration information 230a, for purposes of transport over the interconnection network to networking device 225b. Networking device 225a will not forward the communication to any other systems or devices, such as computing system 205b or networking device 225c, because there are no members of virtual network Z in those regions of the network. After networking device 225b receives the communication, it will disassociate the communication from label L6 and associate the communication with tag T9, as specified by network configuration information 230b, for purposes of transport over the physical network connecting networking device 225b and computing system 205c. When computing system 205c receives the communication, it forwards the communication to VM Manager 215c, which then disassociates the communication from tag T9 and forwards it to virtual machine 210e and/or 210f, depending, for example, on whether the communication was directly addressed to one of those virtual machines or was a broadcast communication. Communications originating with virtual machine 210e or 210f and destined for virtual machine 210b will be processed similarly by the illustrated system. It will be appreciated that communications over such a virtual network may have various forms in various embodiments. For example, some embodiments may support broadcast transmissions that are forwarded to all computing nodes that are part of a virtual network, unicast transmissions that are forwarded to a single destination computing node on a virtual network, and/or multicast transmissions that are forwarded to an indicated group of multiple destination computing nodes on a virtual network. In addition, communication manager modules may be configured to ignore (e.g., not forward) received communications that are not intended for destination computing nodes associated with the communication manager module. For example, if VM Manager module 215c receives a communication from networking device 225b that is not intended for virtual machines 210e or 210f (or other virtual machines hosted on computing system 205c, not shown), the module 215c may determine to ignore the received communication.

FIG. 2C illustrates virtual network Y, superimposed on the network diagram of FIG. 2A. In the illustrated example, virtual machine 210c (VM ID 2.1) and computing system 205d are each members of virtual network Y. Virtual network Y is illustrated logically as links 272a-272c that connect virtual machine 210c and computing system 205d to one another. Computing system 205d may be, for example, a computing system external to the data center and operated by a customer for purposes of interacting with (e.g., to control and/or to provide data for) virtual machine 210c. For clarity, physical network segments as illustrated in FIG. 2A are not shown.

As described with reference to FIG. 2B, virtual network Y is established and maintained by appropriately configuring virtual machine manager modules and/or networking devices. For example, a communication originating with computing system 205d and destined for virtual machine 210c will be associated with tag T7 by a networking module (not shown) of computing system 205d prior to being forwarded over the physical network connecting computing system 205d and networking device 225c. After networking device 225c receives the communication, it will disassociate the communication from tag T7 and associate the communication with label L5, as specified by network configuration information 230c, for purposes of transport over the interconnection network to networking device 225a. Although the intercommunication between computing system 205d and networking device 225c is here described in terms of the same networking protocol used to implement a virtual network over physical networks inside of the data center, it is possible that a third networking protocol may be used in cases where a virtual network is to be extended over networks that are not local to, or administered by, the data center.

Networking device 225c will not forward the communication to any other systems or devices, such as networking device 225b, because there are no members of virtual network Y in those regions of the network. After networking device 225a receives the communication, it will disassociate the communication from label L5 and associate the communication with tag T2, as specified by network configuration information 230a, for purposes of transport over the physical network connecting networking device 225a and computing system 205b. When computing system 205b receives the communication, it forwards the communication to VM Manager 215b, which disassociates the communication from tag T2 and forwards it to virtual machine 210c. Communications originating with virtual machine 210c and destined for computing system 205d will be processed similarly by the illustrated system.

FIG. 2D illustrates virtual network X, superimposed on the network diagram of FIG. 2A. In the illustrated example, virtual machines 210a (VM ID 1.1) and 210d (VM ID 2.2) are each members of virtual network X. Virtual network X is illustrated logically as links 274a-274b that connects virtual machines 210a and 210d to one another. For clarity, physical network links, as shown in FIG. 2A are not shown.

In this example, communications between virtual machines 210a and 210d will be processed in a manner similar to that described with reference to FIGS. 2B and 2C, above. The extent of virtual network X in this example, however, is limited to the physical network connecting networking device 225a with computing systems 205a and 205b. Because all members of virtual network X are on the same physical network, there are no communications for members of the virtual network that will be transported over interconnection network 250. Accordingly, the network configuration information 230a need not include an entry for a label associated with virtual network X. While not illustrated here, a networking switch that is not part of the interconnection network may instead interconnect computing systems 205a and 205b, and if so the communications forwarded for virtual network X may never even reach the networking device 225a.

In some cases, however, members of a virtual network may desire to communicate with nodes that are not members of the virtual network. For example, virtual machine 210a may attempt to communicate with a node accessible via the internet 260 (e.g., a Web server). Such capability may be provided by one or more networking devices that associate and/or disassociate communications with networking identifiers as appropriate, as well as provide other services, such as address translation (e.g., routers providing network address translation functionality).

FIG. 2E illustrates virtual network X, illustrated in an initial state in FIG. 2D, after entry of a new computing node to the virtual network. In particular, a new virtual machine 210g (VM ID 3.3) that is also a member of virtual network X has been initialized and is executing on computing system 205c. In order to enable virtual machine 210g to intercommunicate with other members of virtual network X, the respective virtual machine manager modules and networking devices have been configured appropriately. Specifically, network configuration information 220c of VM Manager 215c has been updated to include a new entry that associates VM ID 3.3 with tag T4. As described above, this tag can be selected without consideration of tags used to represent virtual networks on other physical networks. In addition, network configuration information 230b of networking device 225b has been updated to include a new entry that associates virtual network X with tag T4 for purposes of communication over the physical network local to networking device 225b and label L1 for purposes of communication over the interconnection network 250. Furthermore, the previously existing entry for virtual network X in network configuration information 230a of networking device 225a has been updated to associate virtual network X with label L1 for purposes of communication over the interconnection network 250.

Figure 3:
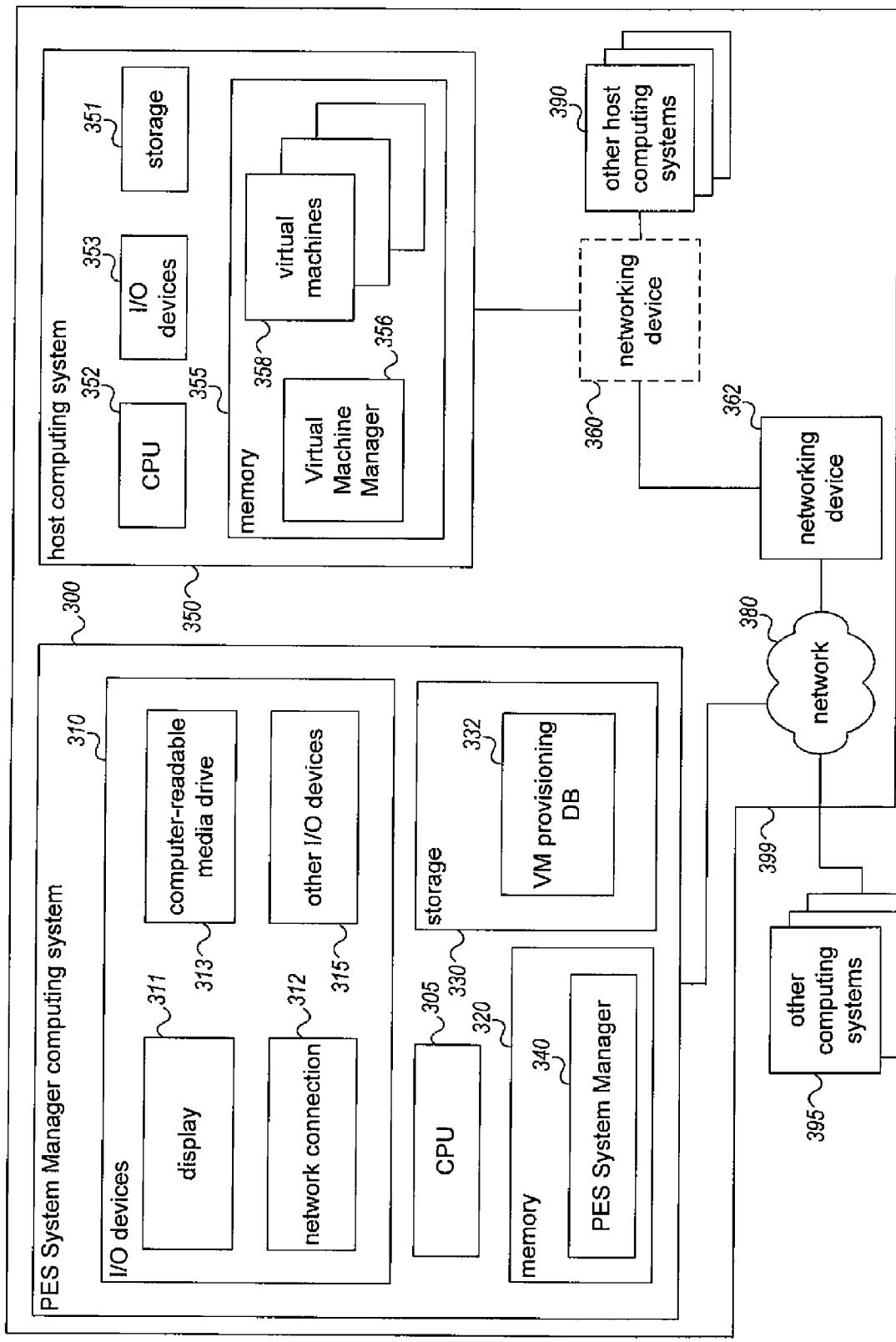
FIG. 3 is a block diagram illustrating example computing systems suitable for executing an embodiment of a system for configuring intercommunications between computing nodes.

FIG. 3 is a block diagram illustrating example computing systems suitable for executing an embodiment of a system for configuring intercommunications between computing nodes. In particular, FIG. 3 illustrates a data center 399 that provides a program execution service. The data center 399 includes a Program Execution Service ("PES") System Manager computing system 300, a host computing system 350 capable of executing one or more virtual machines, and other host computing systems 390 that are similar to host computing system 350. The PES System Manager computing system 300 and host computing systems 350 and 390 are connected to one another via a network 380, a networking device 362, and an optional networking device 360. The network 380 may be an interconnection network that joins multiple disparate physical networks within the data center 399 and possibly provides access to external networks and/or systems, such as computing systems 395. In the illustrated example, the networking device 362 provides a gateway between the network 380 and host computing systems 350 and 390, and the optional networking device 360 may operate to join host computing systems 350 and 390 onto a single physical network. In some embodiments, networking device 362 may be a router or a bridge, whereas optional networking device 360 may be a switch or a hub.

The PES System Manager computing system 300 functions to manage the configuration of virtual networks within the data center 399, as well as to provide other functions related to the provisioning, initialization, and execution of programs within the program execution service. The PES System Manager computing system 300 includes a CPU 305, various I/O components 310, storage 330, and memory 320. The I/O components include a display 311, network connection 312, computer-readable media drive 313, and other I/O devices 315 (e.g., a mouse, keyboard, etc.).

The host computing system 350 functions to host one or more virtual machines, such as to execute programs on behalf of various customers. The host computing system 350 includes a CPU 352, I/O devices 353, storage 351, and memory 355. A virtual machine manager module 356 and one or more virtual machines 358 are executing in the memory 355. The structure of the other host computing systems 390 is similar to that of host computing system 350. In a typical arrangement, data center 399 may include hundreds or thousands of host computing systems such as those illustrated here, organized into a large number of distinct physical networks.

An embodiment of a PES System Manager module 340 is executing in memory 320. In some embodiments, the PES System Manager 340 may receive an indication of a virtual machine to be executed on host computing system 350. The PES System Manager 340 may then determine a virtual network associated with the indicated virtual machine, based on, for example, a customer identity associated with the virtual machine and/or other factors. In some cases, the structure and/or membership of various virtual networks may be provided by the virtual machine provisioning database 332, which stores information related to the physical and virtual resources (e.g., networking, hardware, etc.) associated with various customers and/or executing virtual machines. The PES System Manager 340 may then determine a first networking identifier based on a first networking protocol for the virtual network and a second networking identifier based on a second networking protocol for the virtual network, as described in more detail with reference to FIGS. 2A-2E. The PES System Manager 340 may then configure virtual machine manager module 356 to associate communications from the indicated virtual machine with the first networking identifier, so as to associate such communications with the determined virtual network for purposes of transport over the physical network used by host computing system 350 to communicate with other host computing systems 390 and/or the network 380. The PES System Manager 340 may then configure networking device 362 and/or 360 to associate communications from members of the determined virtual network with the second networking identifier, so as to associate such communications with the determined virtual network for purposes of transport over network 380. In other embodiments, rather than having the PES System Manager determine first and/or second networking identifiers for a virtual network, one or more communication manager modules may instead determine one or both such networking identifiers. For example, virtual machine manager modules may instead determine first networking identifiers to use, whether directly or in conjunction with communication manager modules associated with networking devices.

It will be appreciated that computing systems 300, 350, 390, and 395, and networking devices 360 and 362, are merely illustrative and are not intended to limit the scope of the present invention. For example, computing system 300 may be connected to other devices that are not illustrated, including through one or more networks external to the data center 399 such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate intercommunication capabilities. In addition, the functionality provided by the illustrated modules and systems may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software modules and/or systems may execute in memory on another device and communicate with the illustrated computing system via inter-computer communication. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, components and data structures may also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
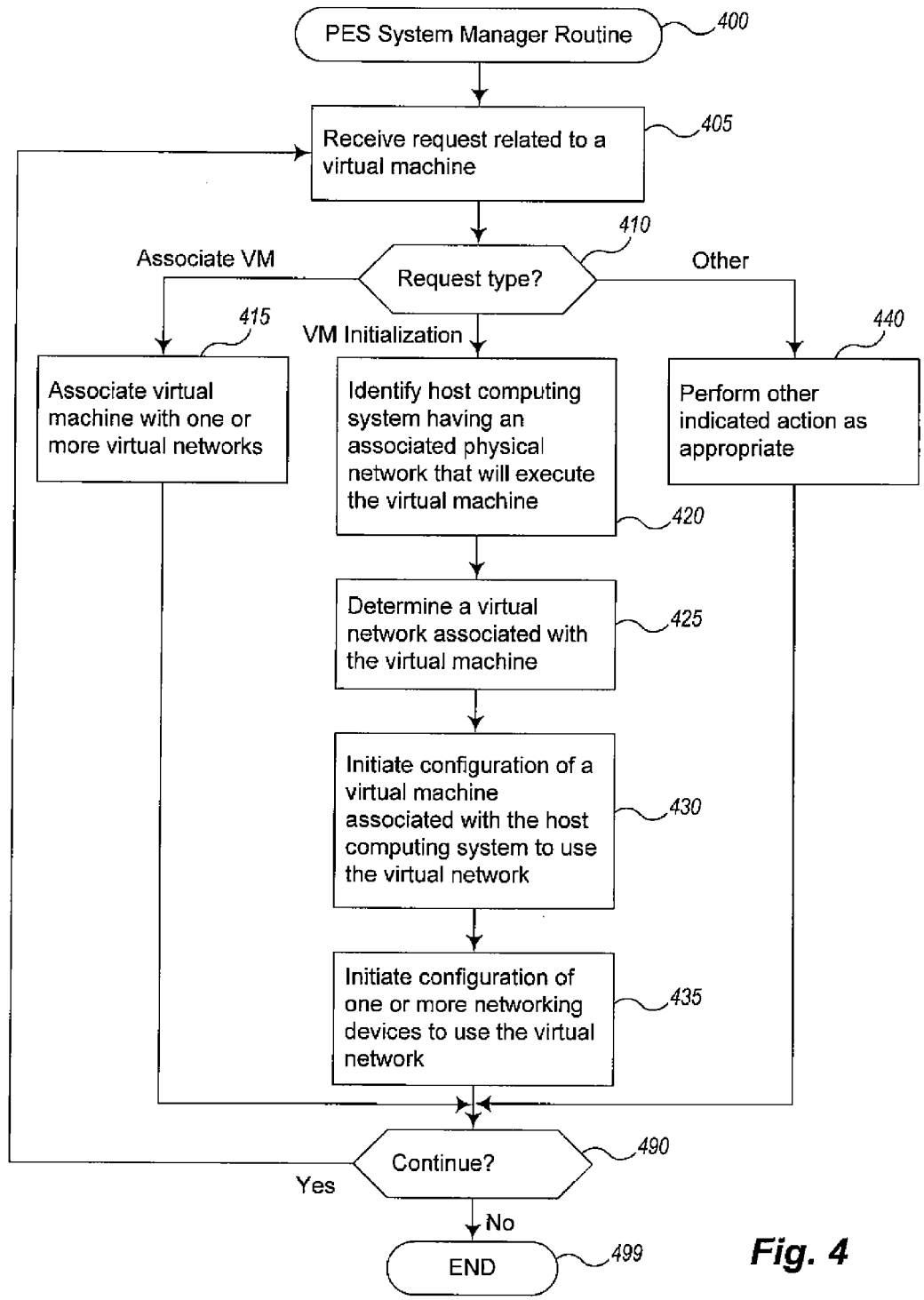
FIG. 4 illustrates a flow diagram of an example embodiment of a Program Execution Service System Manager routine.

FIG. 4 illustrates a flow diagram of an example embodiment of a Program Execution Service System Manager routine. The routine may be provided by, for example, execution of the PES System Manager module 340 of FIG. 3, such as to configure intercommunications between computing nodes of a program execution service.

The illustrated embodiment of the routine 400 begins at block 405, where it receives a request related to a virtual machine. In this embodiment, the request may be received from various sources internal or external to the program execution service (e.g., a remote customer computing system requesting execution of one or more virtual machines). In block 410, the routine determines the type of request received.

If it is determined in block 410 that the request is to associate the virtual machine with one or more virtual networks, the routine continues with block 415. In block 415, the routine associates the virtual machine with one or more virtual networks. Such an association may include, for example, storing a mapping between a particular virtual machine provided or used by a customer with a particular virtual network. Such associations may be established prior to or during the execution of the virtual machine. For example, in one embodiment, a customer may provide a virtual machine image to be executed at some future time, and in such cases, the customer may also request that the virtual machine image be associated with some virtual network used by the customer. In other embodiments, a registered virtual machine image may be automatically assigned to a virtual network, based on various criteria, such as customer identity, an organizational entity (e.g., a branch, department, group, division, etc.), virtual machine function (e.g., Web server, database server, application server, etc.), protocol type (e.g., HTTP, SSL, IP, UDP, etc.), physical and/or virtual identifiers (e.g., virtual machine identifier, IP and/or MAC addresses, etc.), etc. For example, in some embodiments, a given customer or organization can specify a virtual network for use with one group of virtual machines provided by or operated for that customer, and that virtual network can be decomposed into further virtual networks based on the communication protocols used by the virtual machines, so that, for example, all HTTP transmissions are transported on a virtual network that is separate from another virtual network used to transport VoIP ("Voice Over IP") transmissions. The association may be stored in the virtual machine provisioning database 332 of FIG. 3, or a similar data store.

If it is determined in block 410 that the request is to notify the routine of initialization of a virtual machine, the routine continues with block 420. In block 420, the routine identifies a host computing system that has an associated physical network and that is to provide the virtual machine. In some embodiments, this routine may dynamically determine a host computing system to use for purposes of execution, based on various factors such as load balancing, network allocation, etc. In other embodiments, selection of a host computing system may be performed by other modules of the program execution service, and communicated to this routine as part of the received request.

In block 425, the routine determines a virtual network associated with the virtual machine. This may include accessing a database, such as the virtual machine provisioning database 332 of FIG. 3, in order to obtain information regarding previously associated virtual networks, as described with reference to block 415, above.

In block 430, the routine initiates configuration of a virtual machine manager module associated with the identified host computing system to use the virtual network for the virtual machine. Initiating configuration of the virtual machine manager module may include notifying the virtual machine manager module of the identity of the virtual machine and the virtual network associated with the virtual machine. In this embodiment, many other operations related to the implementation or use of the virtual network are left to the virtual machine manager module, as described in more detail with reference to FIG. 5, below. However, in other embodiments, this routine may perform at least some of those operations, such as selecting one or more networking identifiers (e.g., tags, labels, etc.) that may be used to associate communications on the associated physical network with the virtual network.

In block 435, the routine initiates configuration of one or more networking devices to use the virtual network. This may include sending management messages to one or more routers and/or switches to inform such devices of the existence of the virtual network, the identity of the virtual machine, and/or any networking identifiers to use. In other embodiments, such information may be automatically propagated throughout the network automatically by operation of virtual machine manager modules, switches, routers, and/or other networking components. In addition, in at least some embodiments, at least some of the previously discussed configuring of virtual machine manager modules, networking devices that connect a physical network to an interconnection network, and/or networking devices internal to an interconnection network may be performed in advance of associating particular virtual machines with particular virtual networks. For example, some or all of the interconnection network may be pre-configured to associate particular labels or other networking identifiers with particular virtual networks that are not yet in use, or a virtual machine manager module for a physical computing system on a physical network may be pre-configured to associate a particular first networking identifier for the physical network with a particular virtual machine that may later be hosted on the computing system. If so, associating a virtual machine to a new virtual network may merely involve configuring one or more communication manager modules to use a first networking identifier and/or second networking identifier for which one or more physical networks and/or interconnection networks are already configured to use.

If it is determined in block 410 that the request is to perform some other operation, the routine continues with block 440. Other operations may include, for example, removing or eliminating virtual networks, disassociating a virtual machine from one or more virtual networks, notifications related to the operation of the virtual machine (e.g., shutdown, restart, etc.), etc. In block 440, the routine performs the indicated operation as appropriate. For example, if the request included a notification that a virtual machine shut down, the routine may reclaim networking identifiers used to implement a virtual network associated with that virtual machine, so long as no other members of the virtual network continue to execute.

After blocks 415, 435, and 440, the routine continues with block 490 and determines whether to continue, and if so, continues to block 405 to await the next request. If not, the routine terminates in block 499. The routine may determine not to continue execution when, for example, it receives a shutdown or restart notification.

Figure 5:
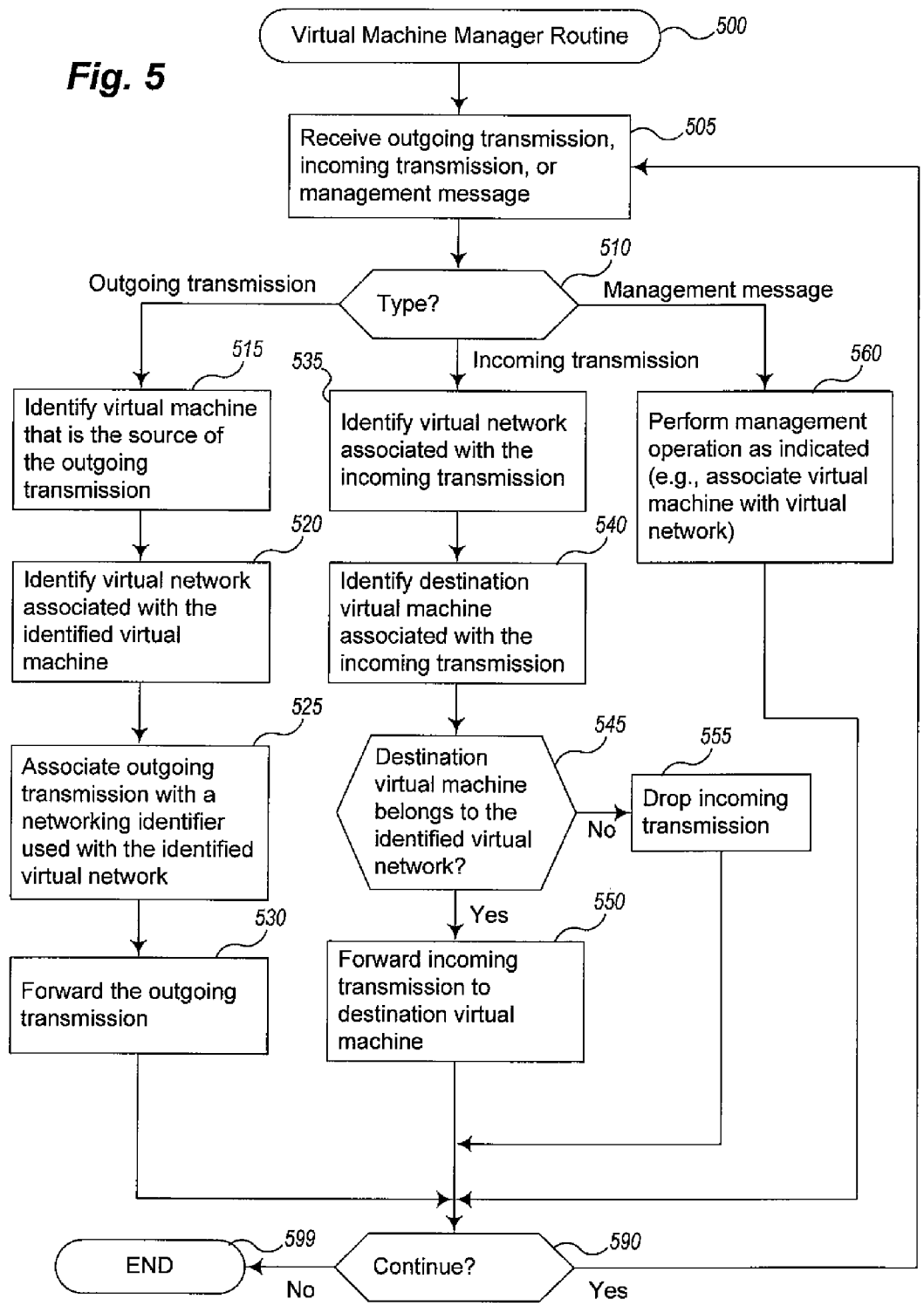
FIG. 5 illustrates a flow diagram of an example embodiment of a Virtual Machine Manager routine.

FIG. 5 illustrates a flow diagram of an example embodiment of a Virtual Machine Manager routine. The routine may be provided by, for example, execution of the Virtual Machine Manager module 356 of FIG. 3, such as to manage inbound and outbound communications on host computing system 350 for purposes of establishing and enforcing one or more virtual networks used by virtual machines 358.

The illustrated embodiment of the routine 500 begins at block 505, where it receives an outgoing transmission, incoming transmission, or a management message. In this embodiment, an outgoing transmission is a communication sent by a virtual machine that is resident (e.g., executing) on the host computing system managed by this routine. An incoming transmission is a communication sent by some computing node to a virtual machine or program that is resident on the host computing system managed by this routine. Management messages may include messages related to the set up and/or tear down of virtual networks, as well as operation of virtual machines generally (e.g., to initiate execution of a virtual machine, to shut down a virtual machine, etc.). In block 510, the routine determines the type of transmission or message received.

If it is determined in block 510 that an outgoing transmission has been received, the routine continues with block 515. In block 515, the routine identifies a virtual machine that is the source of the outgoing transmission. Identifying the virtual machine that is the source of the outgoing transmission may be accomplished by inspecting addressing information (e.g., in a packet header that includes a source and destination address) associated with the transmission.

In block 520, the routine identifies a virtual network associated with the identified virtual machine. Identifying the virtual network associated with the identified virtual machine may include inspecting or otherwise accessing a network configuration database, maintained by the virtual machine manager module or some other component on the host computing system, and used to store network configuration information, such as is described with reference to FIGS. 2A-2E, which includes associations (e.g., mappings) between virtual machines and virtual networks. In addition, such a network configuration database may include a networking identifier (e.g., a tag) that may be used for purposes of associating the transmission with the identified virtual network.

In block 525, the routine associates the outgoing transmission with a networking identifier used with the identified virtual network. Associating the outgoing transmission with the networking identifier may include marking, tagging, labeling, encapsulating or otherwise modifying the data transmission so that it may be identified as being associated with the virtual network. For example, if the transmission is a packet, then the header of the packet may be modified or augmented with the networking identifier.

In block 530, the routine forwards the outgoing transmission. Forwarding the outgoing transmission includes sending or otherwise transmitting it onto a physical network used by the host computing system to communicate with other nodes, such as by providing the packet to a network driver or interface to be transmitted via a network interface device (e.g., an Ethernet card).

If it is determined in block 510 that an incoming transmission has been received, the routine continues with block 535. In block 535, the routine identifies a virtual network associated with the incoming transmission. The virtual network may be identified by inspecting addressing information associated with the incoming transmission. For example, if the incoming transmission is a packet, the packet header may include a networking identifier, such as one applied by a remote virtual machine manager module and/or networking device. The networking identifier can then be associated with the appropriate virtual network, such as by inspecting or accessing the network configuration database.

In block 540, the routine identifies a destination virtual machine associated with the incoming transmission. The destination virtual machine may be identified by inspecting addressing information, as described in more detail with reference to block 535, above. For example, if the incoming transmission is a packet, the packet header may include a destination address (e.g., an IP address, a MAC address, etc.) of a virtual machine. In some cases, the incoming transmission may be a broadcast transmission, in which case the routine will identify all of the virtual machines on the host computing system as destination virtual machines.

In block 545, the routine determines whether the destination virtual machine belongs to the identified virtual network, and if so, continues with block 550. By performing this check, the routine may assure that destination virtual machines only receive transmissions that have been correctly associated with a virtual network that is associated with the destination virtual machine. For example, if the incoming transmission was a broadcast packet, the packet should only be delivered to those virtual machines belonging to the virtual network identified in the broadcast packet. In block 550, the routine forwards the incoming transmission to the destination virtual machine or machines. Forwarding the incoming transmission may include providing data associated with the transmission to the virtual machine, such as by placing a packet or packet contents into a network queue. Typically, a networking identifier utilized to associate the transmission with a virtual network will be stripped prior to forwarding, so that the existence of the virtual machine is transparent to the destination virtual machine.

If it is instead determined in block 545 that the destination virtual machine does not belong to the identified virtual network, the routine continues with block 555. In block 555, the routine drops the incoming transmission. As noted above, this operation assures that only correctly addressed transmissions are forwarded to their respective destinations, so as to enforce the proper operation of the established virtual networks.

If it is determined in block 510 that a management message has been received, the routine continues with block 560. In block 560, the routine performs an operation responsive to the management message as appropriate. The received management message may be, for example, an instruction to associate a virtual machine with a particular virtual network. Such a management message may be received from, for example, the PES System Manager routine of FIG. 4. In response, this routine may perform various operations, such as updating the network configuration database as appropriate, selecting networking identifiers to utilize for the virtual network, and/or initiating configuration of other networking devices (e.g., sending a management message to a router or a switch to configure the device to recognize and properly process transmission associated with the virtual network). Other types of management messages may also be received and processed, such as requests to disassociate a given virtual machine with a particular virtual network, or requests related to the general operation of virtual machines on the host computing system (e.g., to initiate execution of a virtual machine, to shut down a virtual machine, etc.).

After blocks 530, 550, 555, and 560 the routine continues with block 590 and determines whether to continue, and if so, continues to block 505 to await the next transmission or management message. If not, the routine terminates in block 599.

Figure 6:
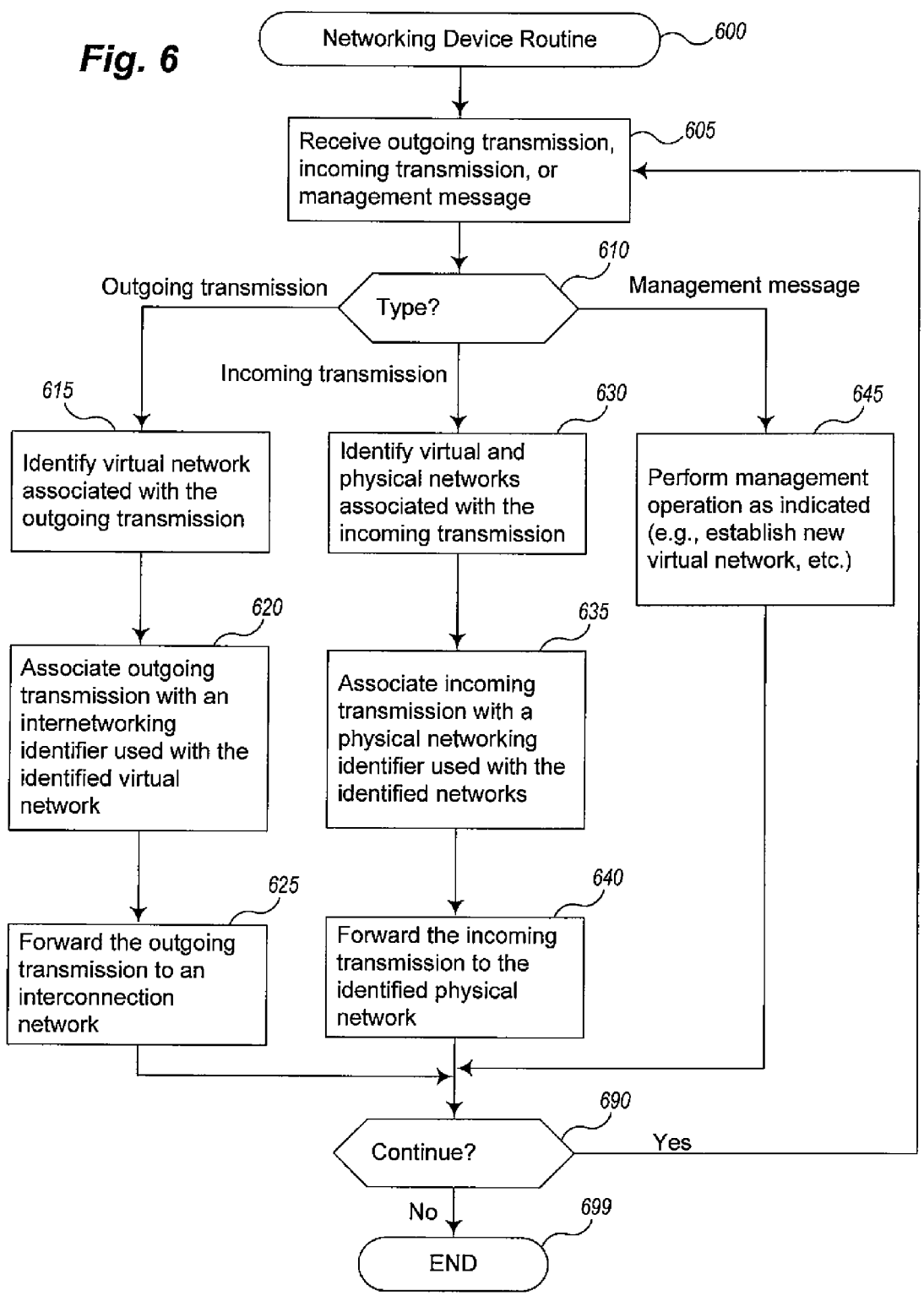
FIG. 6 illustrates a flow diagram of an example embodiment of a Networking Device routine.

FIG. 6 illustrates a flow diagram of an example embodiment of a Networking Device routine. The routine may be provided by, for example, execution of networking device 362 of FIG. 3, such as to manage communications between one or more physical networks and an interconnection network for purposes of establishing and enforcing one or more virtual networks used by virtual machines and other nodes distributed across those networks.

The illustrated embodiment of the routine 600 begins at block 605, where it receives an outgoing transmission, incoming transmission, or a management message. An outgoing transmission is a communication sent by a virtual machine via a physical network and destined for one or more nodes that are reachable via the interconnection network and/or via that physical network. An incoming transmission is a communication sent by some communicating node via the interconnection network to a virtual machine that is resident on a host computing system reachable via one of the physical networks accessible via the networking device. Management messages include messages related to the set up and/or tear down of virtual networks, notification of routing information (e.g., related to dynamic updates of network topology), etc. In block 610, the routine determines the type of transmission or message received.

If it is determined in block 610 that an outgoing transmission has been received, the routine continues with block 615. In block 615, the routine identifies a virtual network associated with the outgoing transmission. The virtual network associated with the outgoing transmission may be identified based on addressing information associated with the outgoing transmission. For example, if the outgoing transmission is a packet sent by a virtual machine manager module, such as the one described with reference to FIG. 5, the packet will include a networking identifier (e.g., a tag) that associates the packet with a particular virtual network. Then, by inspecting a network configuration database maintained by the networking device, the routine can determine the virtual network associated with the packet, as discussed in more detail with respect to FIGS. 2A-2E.

In block 620, the routine associates the outgoing transmission with an internetworking identifier used with the identified virtual network. As discussed with reference to FIGS. 2A-2E, some embodiments will use a first type of networking identifier (e.g., a tag) to associate communications with a virtual network for purposes of transport over a physical network, and a second type of networking identifier (e.g., a label) for purposes of transport over an interconnection network. In this block, the routine determines a networking identifier that may be associated with the transmission as it is forwarded to the interconnection network. The networking identifier may be determined based on the virtual network identified in block 615, such as by looking up the virtual network in the network configuration database to find an associated label, as described with reference to FIGS. 2A-2E. Associating the outgoing transmission with the internetworking identifier may include first stripping any networking identifiers (e.g., tags) used to transport the transmission over the physical network to the networking device. Then, the transmission may be labeled, encapsulated, or otherwise modified so that it may be identified as being associated with the virtual network as it is transported over the interconnection network.

In block 625, the routine forwards the outgoing transmission to an interconnection network by, for example, providing the transmission to a networking interface connected to the interconnection network.

If it is determined in block 610 that an incoming transmission has been received, the routine continues with block 630. In block 630, the routine identifies virtual and physical networks associated with the incoming transmission. Because an incoming transmission will typically have been forwarded to this routine by another, similarly configured networking device, the virtual network can generally be identified by inspecting the data transmission, such as by examining header information associated with a packet to identify a networking identifier that is associated with a virtual network in the network configuration database maintained by the networking device executing this routine. The physical network associated with the incoming transmission is the destination physical network associated with the destination virtual machine, as indicated by network topology information (e.g., a routing table) maintained by the networking device executing this routine. In some cases, multiple physical networks may be identified, for example, if the incoming transmission is a broadcast transmission for all members of a virtual network, and different members of the virtual network are associated with distinct physical networks accessible via this networking device.

In block 635, the routine associates the incoming transmission with a physical networking identifier used with the identified virtual and/or physical networks. Here, any networking identifiers used to transport the transmission over the interconnection network are stripped from the transmission, and then networking identifiers that will be used to transport the transmission over the identified physical network or networks are associated with the transmission.

In block 640, the routine forwards the incoming transmission to the identified physical network, by for example, providing the transmission to an appropriate networking interface connected to the identified physical network.

If it is determined in block 610 that a management message has been received, the routine continues with block 645. In block 645, the routine performs an operation responsive to the management message as appropriate. As noted above, management messages may be related to set up or tear down of virtual networks, resulting in adjustments or other changes to the network configuration database maintained by the networking device.

After blocks 625, 640, and 645 the routine continues with block 690 and determines whether to continue, and if so, continues to block 605 to await the next transmission or management message. If not, the routine terminates in block 699.

In addition, various embodiments may provide mechanisms for customer users and other users to interact with an embodiment of the program execution service for purpose of configuring intercommunications between various virtual machines and/or other programs. For example, some embodiments may provide an interactive console (e.g. a client application program providing an interactive user interface, a Web browser-based interface, etc.) from which users can manage the creation or deletion of virtual networks and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). Additional details related to the operation of example embodiments of a program execution service with which the described techniques may be used are available in U.S. application Ser. No. 11/394,595, filed Mar. 31, 2006 and entitled "Managing Communications Between Computing Nodes," and U.S. application Ser. No. 11/395,463, filed Mar. 31, 2006 and entitled "Managing Execution of Programs by Multiple Computing Systems," both of which are incorporated herein by reference in their entireties.

In addition, some embodiments may provide an API ("application programming interface") that allows other computing systems and programs to programmatically invoke at least some of the described functionality. Such APIs may be provided by libraries or class interfaces (e.g., to be invoked by programs written in C, C++, or Java) and/or network service protocols such as via Web services.

Those skilled in the art will also realize that although in some embodiments the described techniques are employed in the context of a data center housing multiple physical machines hosting virtual machines, and/or in the context of a program execution service, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for configuring intercommunications between computing systems, the method comprising:

determining a virtual network to which an indicated program is to be associated, the indicated program to be executed on one of multiple virtual machines that are hosted by a first computing system associated with a program execution service, the first computing system being connected to a first of multiple physical networks of the program execution service that are configured to communicate via an interconnection network, the determined virtual network including computing systems on multiple of the physical networks of the program execution service;

automatically enabling the one virtual machine of the first computing system to intercommunicate with other computing systems that are part of the determined virtual network, by:

identifying a first networking identifier based on a first networking protocol that is associated with the determined virtual network and that is for use with the first physical network, and identifying a second networking identifier based on a second networking protocol that is associated with the determined virtual network and that is for use with the interconnection network;

configuring a communication manager module for the first computing system to associate communications from the indicated program on the one virtual machine with the determined virtual network by using the first networking identifier with the communications; and configuring a networking device that connects the first physical network to the interconnection network to forward communications associated with the determined virtual network to the other physical networks that have computing systems that are part of the determined virtual network by using the second networking identifier with the forwarded communications;

under control of the configured communication manager module, sending on the first physical network a communication from the indicated program on the one virtual machine, the sent communication on the first physical network being associated with the first networking identifier and being directed to a destination computing system that has a hosted virtual machine associated with the determined virtual network, the destination computing system being on a second of the multiple physical networks that is distinct from the first physical network; and under control of the configured networking device, forwarding the sent communication from the first physical network over the interconnection network toward the second physical network, the forwarded sent communication being associated with the second networking identifier.

2. The method of claim 1 wherein the sent communication includes one or more network packets that each indicates the destination computing system as a destination of the packet.

3. The method of claim 2 wherein each of the network packets is an Ethernet packet.

4. The method of claim 1 wherein the method further comprises, under control of another networking device that connects the second physical network to the interconnection network, receiving the forwarded communication and sending the forwarded communication on the second physical network by associating a third networking identifier with the communication as it is sent over the second physical network, the third networking identifier being based on a third networking protocol that is associated with the determined virtual network and that is for use with the second physical network.

5. The method of claim 1 wherein the configuring of the communication manager module for the first computing system to use the first networking identifier with communications from the indicated program is performed such that the communications using the first networking identifier on the first physical network are not forwarded to computing systems of the first physical network that do not have a hosted virtual machine associated with the determined virtual network.

6. The method of claim 1 wherein the using of the second networking identifier with forwarded communications by the configured networking device includes adding the second networking identifier to addressing information associated with the forwarded communications.

7. The method of claim 1 wherein the using of the first networking identifier with communications by the configured communications manager module includes adding the first networking identifier to addressing information associated with the communications.

8. The method of claim 1 wherein the automatic enabling of the one virtual machine to intercommunicate with the other computing systems on the determined virtual network includes configuring multiple networking devices internal to the interconnection network to forward communications associated with the second networking identifier to other physical networks of the program execution service that have one or more computing systems that are part of the determined virtual network.

9. The method of claim 1 wherein the automatic enabling of the one virtual machine to intercommunicate with the other computing systems on the determined virtual network is performed as part of provisioning the one virtual machine to execute the indicated program.

10. The method of claim 1 wherein the determining of the virtual network to which the indicated program is to be associated is based at least in part on a customer of the program execution service on whose behalf the indicated program is being executed.

11. The method of claim 1 wherein the networking device is a router configured to provide a gateway between the first physical network and the interconnection network.

12. The method of claim 1 wherein the communication manager module for the first computing system is executed on the first computing system.

13. The method of claim 1 wherein the first and second networking protocols are distinct.

14. The method of claim 1 wherein the first networking protocol is based on at least one of a Virtual Local Area Network (VLAN) tagging protocol, an Internet Protocol Security (IPSEC) protocol, a Layer 2 Tunneling (L2TP) protocol, a Point-to-Point Tunneling Protocol (PPTP), a Multi-Protocol Label Switching (MPLS) protocol, an Internet Protocol in Internet Protocol (IP in IP) encapsulation protocol, a Border Gateway Protocol (BGP), a Virtual Private Local Area Networking Services (VPLS) protocol, and a Generic Routing Encapsulation (GRE) protocol.

15. The method of claim 1 wherein the second networking protocol is based on at least one of a Virtual Local Area Network (VLAN) tagging protocol, an Internet Protocol Security (IPSEC) protocol, a Layer 2 Tunneling (L2TP) protocol, a Point-to-Point Tunneling Protocol (PPTP), a Multi-Protocol Label Switching (MPLS) protocol, an Internet Protocol in Internet Protocol (IP in IP) encapsulation protocol, a Border Gateway Protocol (BGP), a Virtual Private Local Area Networking Services (VPLS) protocol, and a Generic Routing Encapsulation (GRE) protocol.

16. The method of claim 1 wherein the determined virtual network further includes one or more other computing systems that are not part of the program execution service, and wherein the automatic enabling of the one virtual machine to intercommunicate with other computing systems that are part of the determined virtual network includes configuring a networking device that connects the interconnection network to a communication connection external to the program execution service in such a manner as to forward communications associated with the determined virtual network to at least one of the other computing systems.

17. The method of claim 16 wherein the external communication connection is the Internet.

18. The method of claim 16 wherein the indicated program is executed on behalf of a customer of the program execution service, and wherein the one or more other computing systems are operated by the customer.

19. The method of claim 1 wherein the determined virtual network includes at least one computing system that does not host virtual machines.

20. The method of claim 1 wherein at least some of the computing systems of the program execution service are housed in a data center facility that includes the interconnection network and at least some of the multiple physical networks.

21. The method of claim 1 wherein the determining of the virtual network to which the indicated program is to be associated is performed in response to a received indication to execute the indicated program.

22. A non-transitory computer-readable medium whose contents include instructions that when executed configure a computing system to configure intercommunications between computing systems, by performing a method comprising:
  automatically enabling a software program executing on an indicated computing node to intercommunicate with other computing nodes associated with a virtual network, the indicated computing node being one of multiple computing nodes connected to a first of multiple physical networks of a program execution service that are able to intercommunicate via one or more networking devices, at least some of the other computing nodes associated with the virtual network being on other of the multiple physical networks distinct from the first physical network, by:
  configuring a communication manager module for the indicated computing node to associate communications from the indicated computing node with the virtual network in such a manner as to use with the communications a first networking identifier that is based on a first networking protocol for the first physical network and is specific to the virtual network; and configuring at least one of the one or more networking devices to forward communications that are associated with the virtual network and received using the first networking identifier, the forwarding of the communications including using with the forwarded communications a second networking identifier that is based on a distinct second networking protocol and is specific to the virtual network, the forwarded communications being forwarded over another physical network that is distinct from the first physical network and that uses the second networking protocol, and such that the forwarded communications are provided to at least one of the at least some other computing nodes on at least one of the other of the multiple physical networks;

under control of the configured communication manager module, sending on the first physical network a communication from the software program on the indicated computing node, the sent communication on the first physical network being associated with the first networking identifier and being directed to a destination computing system that is associated with the determined virtual network and is on a second of the multiple physical networks that is distinct from the first physical network; and under control of one of the configured at least one networking devices, forwarding the sent communication over the another physical network toward the destination computing system on the second physical network, the forwarded sent communication being associated with the second networking identifier.

23. The non-transitory computer-readable medium of claim 22 wherein the indicated computing node is one of multiple virtual machines hosted by a physical computing system on the first physical network, and wherein the communication manager module for the indicated computing node is a virtual machine manager module that executes on the physical computing system to manage communications by the multiple hosted virtual machines.

24. The non-transitory computer-readable medium of claim 22 wherein the method further comprises automatically determining the virtual network based at least in part on the software program to be executed by the one virtual machine.

25. The non-transitory computer-readable medium of claim 22 wherein the configuring of the communication manager module for the indicated computing node includes identifying the first networking identifier based on the first networking protocol to be used with the communications from the indicated computing node, and wherein the configuring of the at least one networking devices includes identifying the second networking identifier based on the second networking protocol to be used with the communications from the indicated computing node and associating the first networking identifier with the second networking identifier.

26. The non-transitory computer-readable medium of claim 22 wherein the computer-readable medium is a memory of the configured computing system.

27. A system structured to configure intercommunications between multiple hosted virtual machines each configurable to execute one or more programs, comprising:

one or more processors of one or more computing devices;

a system manager module configured to, when executed by at least one of the one or more processors, maintain virtual networks among multiple computing systems that each are connected to one of multiple physical networks, at least some of the multiple computing systems each hosting multiple virtual machines that are each configurable to execute one or more programs, each of the at least some computing systems having a virtual machine communication manager module configured to manage communications of the virtual machines hosted by that computing system that are sent over the physical network to which that computing system belongs, each physical network having a communication manager module configured to forward communications to other physical networks, the maintaining of the virtual networks including, in response to an indication of a virtual machine hosted on one of the at least some computing systems that is to be associated with one of the virtual networks:

configuring the virtual machine communication manager module of the one computing system to associate communications by the indicated virtual machine with the one virtual network via use of a first networking identifier that is specific to the one virtual network and to a first physical network, the first physical network being the physical network to which the one computing system belongs, the first networking identifier being based on a first networking protocol that is specific to the first physical network, such that the communications by the indicated virtual machine are not made available to computing systems that are not part of the one virtual network; and configuring the communication manager module associated with the first physical network to forward received communications that use the first networking identifier to other physical networks in a manner associated with the one virtual network, the forwarding of the received communications being performed via use of a second networking identifier specific to the one virtual network, the second networking identifier being based on a distinct second networking protocol specific to an interconnection network that connects the multiple physical networks;

the configured virtual machine communication manager module, wherein the configured virtual machine communication manager module when executed sends on the first physical network a communication from the indicated virtual machine, the sent communication on the first physical network being associated with the first networking identifier and being directed to a destination computing system that has a hosted virtual machine associated with the one virtual network, the destination computing system being on a second of the multiple physical networks that is distinct from the first physical network; and the configured communication manager module, wherein the configured communication manager module when executed forwards the sent communication from the first physical network over the interconnection network toward the second physical network, the forwarded sent communication being associated with the second networking identifier.

28. The system of claim 27 further comprising the multiple computing systems that are connected to the multiple physical networks.

29. The system of claim 27 wherein the virtual machine communication manager modules each execute on the computing system hosting the virtual machines whose communications are managed by the virtual machine communication manager module, and wherein the communication manager modules are each part of a networking device that connects a physical network to the interconnection network.

30. The system of claim 27 wherein, for at least one of the virtual networks, the first networking identifier specific to the virtual network and the second networking identifier specific to the virtual network are the same.

31. The system of claim 27 wherein the system manager module is provided by a program execution service to maintain virtual networks on behalf of customers of the program execution service, and wherein the received indication of the virtual machine to be associated with the indicated virtual network is based on one of the customers initiating execution of one or more programs of the customer on the indicated virtual machine, such that the virtual network with which the indicated virtual machine is to be associated is a virtual network associated with the customer.

32. The system of claim 27 wherein the system manager module includes software instructions for execution in memory of one or more computing systems.

* * * * *

UNITED STATES PATENT AND TRADEMARK OFFICE
CERTIFICATE OF CORRECTION

PATENT NO.         : 8,055,789 B2
APPLICATION NO.    : 11/692038
DATED              : November 8, 2011
INVENTOR(S)        : David R. Richardson et al.

It is certified that error appears in the above-identified patent and that said Letters Patent is hereby corrected as shown below:

Title page 2, line 22, Item (56):
"Strand, L., "Adaptive distributed firewall using intrusion detection," November 1, 2004, University of Oslo Department of Informatics, retrieved March 8, 2006, from http://gnist.org/~lars/studies/master/StrandLars-master.dpf, 158 pages." should read, --Strand, L., "Adaptive distributed firewall using intrusion detection," November 1, 2004, University of Oslo Department of Informatics, retrieved March 8, 2006, from http://gnist.org/~lars/studies/master/StrandLars-master.pdf, 158 pages.--.

Signed and Sealed this
Tenth Day of July, 2012

David J. Kappos
*Director of the United States Patent and Trademark Office*